US006976214B1

United States Patent
Bates et al.

(10) Patent No.: US 6,976,214 B1
(45) Date of Patent: Dec. 13, 2005

(54) METHOD, SYSTEM, AND PROGRAM FOR ENHANCING TEXT COMPOSITION IN A TEXT EDITOR PROGRAM

(75) Inventors: Cary Lee Bates, Rochester, MN (US); Paul Rueben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 09/636,655

(22) Filed: Aug. 3, 2000

(51) Int. Cl.[7] .......................................... G06F 17/00
(52) U.S. Cl. .................... 715/532; 715/530; 715/531; 715/540
(58) Field of Search .............................. 715/530, 531, 715/532, 540

(56) References Cited

U.S. PATENT DOCUMENTS

| | | | | |
|---|---|---|---|---|
| 4,888,730 A | * | 12/1989 | McRae et al. ............... 715/531 |
| 5,267,156 A | * | 11/1993 | Nomiyama .................. 704/10 |
| 5,873,660 A | * | 2/1999 | Walsh et al. ................. 400/63 |
| 6,654,731 B1 | * | 11/2003 | Mahesh ........................ 706/45 |
| 6,684,221 B1 | * | 1/2004 | Rejndrup .................. 707/104.1 |
| 6,807,545 B1 | * | 10/2004 | VanDamme ................. 707/102 |

OTHER PUBLICATIONS

Wintertree-Software, "Add Grammar-Checking Capability to your MFC and Visual Basic Applications", [online], [retrieved Feb. 18, 2000]. Retrieved from Internet <URL: wysrwyg://24/http://wintertree-software.com/dev/wgrammar/.

* cited by examiner

Primary Examiner—Stephen Hong
Assistant Examiner—Gregory Vaughn
(74) Attorney, Agent, or Firm—Konrad, Raynes & Victor, LLP (57) ABSTRACT

Disclosed is a system, method, and program for editing text in a computer text editor program. A determination is made of terms repeated in a section of text. A determination is then made of terms associated with the repeated terms that may be used as substitute terms for the repeated terms. A selection is made of one instance of one repeated term in the text and user selection is received of one associated term for the selected instance of the repeated term. The selected associated term is replaced for the selected instance of the repeated term in response to the user selection. Moreover, associates of repeated terms may be categorized by groups, such as groups of literary categories.

33 Claims, 6 Drawing Sheets

METHOD, SYSTEM, AND PROGRAM FOR ENHANCING TEXT COMPOSITION IN A TEXT EDITOR PROGRAM

BACKGROUND OF THE INVENTION

1. Field of the Invention

Preferred embodiments provide a method, system, and program for editing text and, in particular, improving the composition and form of text.

2. Description of the Related Art

One challenge writers face when composing a document or text is to avoid repetitive use of key words and phrases. Writers can improve the flow of their composition by editing a document to replace frequently repeated words or phrases with different words or phrases that convey the same thought. In fact, H. W. Fowler's famous work on English composition "The Kings English", $2^{nd}$ ed. (1908) cautions that > Vivid writers must be careful not to repeat any conspicuous phrase so soon that a reader of ordinary memory has not had time to forget it before it invites his attention again. Whatever its merits, to use it twice (unless deliberately and with point) is much worse than never to have thought of it.

*The Kings English* Ch. II, Part 60.

Below is an example of a passage that repeats a key term:

> In many ways our shoes can talk. But not with their tongues. By their size they show how big we are. By their make and style they show who we are; that is, they show our status, our occupation, what we see in ourselves, and how we want others to see us.

The writer would recognize that in the above passage the word "show" is repeated. To improve the flow and composition of the passage, the writer would edit the passage by replacing repeated instances of "show" with different words that convey the same meaning. For instance, the edited passage that replaces repeated instances of "show" could read:

> In many ways our shoes can talk. But not with their tongues. By their size they tell how big we are. By their make and style they reveal who we are; that is, they show our status, our occupation, what we see in ourselves, and how we want others to see us.

Current word processing programs allow writers to check and correct spelling mistakes and the grammar of the passage. Further, prior art word processing programs typically include a thesaurus associating synonyms with words. Word processing programs typically display a dialog box in which the user enters a term and selects a push button to cause the thesaurus program to access synonyms associated with the entered term. Thus, with current word processing art, a user could remove repeated words by manually editing the text, using a mouse or other pointing device to position the cursor to repeated instances of terms in the text, and then invoking the thesaurus dialog to find synonymous terms to substitute for the repeated term using a computer input device such as a mouse.

There is a need in the art for an improved technique for allowing users to determine and select alternate words and phrases when editing or creating a document to improve composition so that a reader of ordinary memory has had enough time to forget a key term or phrase before reading it again.

SUMMARY OF THE PREFERRED EMBODIMENTS

To overcome the limitations in the prior art described above, preferred embodiments disclose a computer implemented method, system, and program for editing text in a computer text editor program. A determination is made of terms repeated in a section of text. A determination is then made of terms associated with the repeated terms that may be used as substitute terms for the repeated terms. A selection is made of one instance of one repeated term in the text and user selection is received of one associated term for the selected instance of the repeated term. The selected associated term is replaced for the selected instance of the repeated term in response to the user selection.

The repeated terms may include terms that are different words but include a same word stem.

The section of text in which repeated terms are determined is capable of comprising a paragraph, a sentence, a page, a sub-heading or the entire document.

In further embodiments, a graphical user interface (GUI) is displayed with the repeated terms. The selected instance of the repeated term in the text is graphically indicated and the determined terms associated with the selected repeated term are displayed. The user selected associated term is substituted into the text for the graphically indicated selected repeated term. Graphical indication is then made of a next repeated term in the text.

In still further embodiments, different groups of associated terms are maintained, wherein each group comprises different sets of associated terms. A determination is made of a selected group of associated terms, such as a literary category of associated terms. In such case determining the terms associated with the selected repeated term further comprises determining terms in the selected group associated with the selected repeated term, wherein different groups are capable of providing different associated terms for the selected repeated term.

Preferred embodiments provide a tool for use with a word processing program that locates repeated terms and provides the user with a list of possible substitute terms to use for the repeated term. With the preferred embodiments, the user can view the repeated terms and determine how to substitute terms for the repeated terms to avoid using the same term frequently, which is undesirable from a composition standpoint. Moreover, with preferred embodiments, the user may select a particular literary category, e.g., the Bible, Shakespeare, Mark Twain, etc., of associated terms to use when determining a term to substitute for a repeated term. In this way, the user can locate substitute terms that are related according to a specific literary category.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
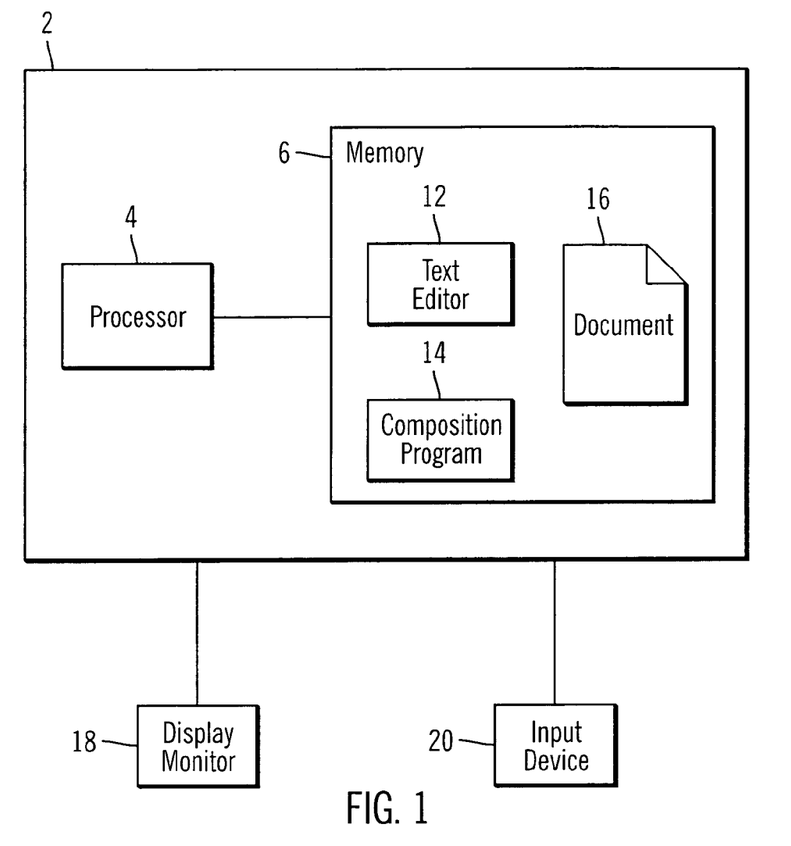
FIG. 1 illustrates a computing environment in which preferred embodiments are implemented.

FIG. 1 illustrates a computing environment in which preferred embodiments are implemented. The computing environment includes a computer system 2 having a processor 4 and a memory 6. The processor 4 may comprise any computer microprocessor device known in the art. The memory 6 may comprise any computer volatile memory device known in the art for storing data structures that the processor 4 is accessing and processing. Alternatively, the memory 6 may comprise any type of non-volatile storage device known in the art capable of being accessed by the processor 4, such as a hard disk drive, tape drive, etc.

The memory 6 includes a text editor program 12, a composition program 14, and document 16. The text editor program 12 executes in memory 6 to provide a graphical user interface (GUI) text editing tool known in the art, such as WORDPERFECT, MICROSOFT WORD, LOTUS WORD PRO. etc.** The composition program 14 may be a component within the installed text editor program 12 or a separate utility that is integrated with the text editor program 12 user interface. The system further includes a display monitor 18 for displaying the graphical user interface (GUI) of the text editor program 12 and at least one input device 20, such as a touch pad, touch screen, mouse, pen stylus, keyboard, and/or any other input device known in the art capable of selecting displayed graphical elements and entering user input.

The composition program 14 searches specified portions of the document 16 for instances of repeated terms. The definition of a repeated term terms depends upon the unit of the document 16 the composition program 14 searches. For instance, if the unit searched is a paragraph, then the definition of a repeated term may be any term used more than once in the paragraph. Alternatively, if the unit searched is a sentence or sub-section within the document, then the definition of repeated term may be any word or word stem repeated twice in a sentence. If the repeated term is a word "stem", then the composition program 14 would use a stemming algorithm known in the art to locate all words including the same word "stem", e.g., "gratify", "gratification", "grateful," "ungrateful", "ingrate", etc. Still further, the composition program 14 may define a repeated term as repeated a determined number of times, where the determined number of times is a function of the total number of words in the section or whole of the document being considered. Thus, if the section considered is relatively short, then a repeated term would need to be repeated fewer times than a repeated term in a relatively longer section.

Figure 2:
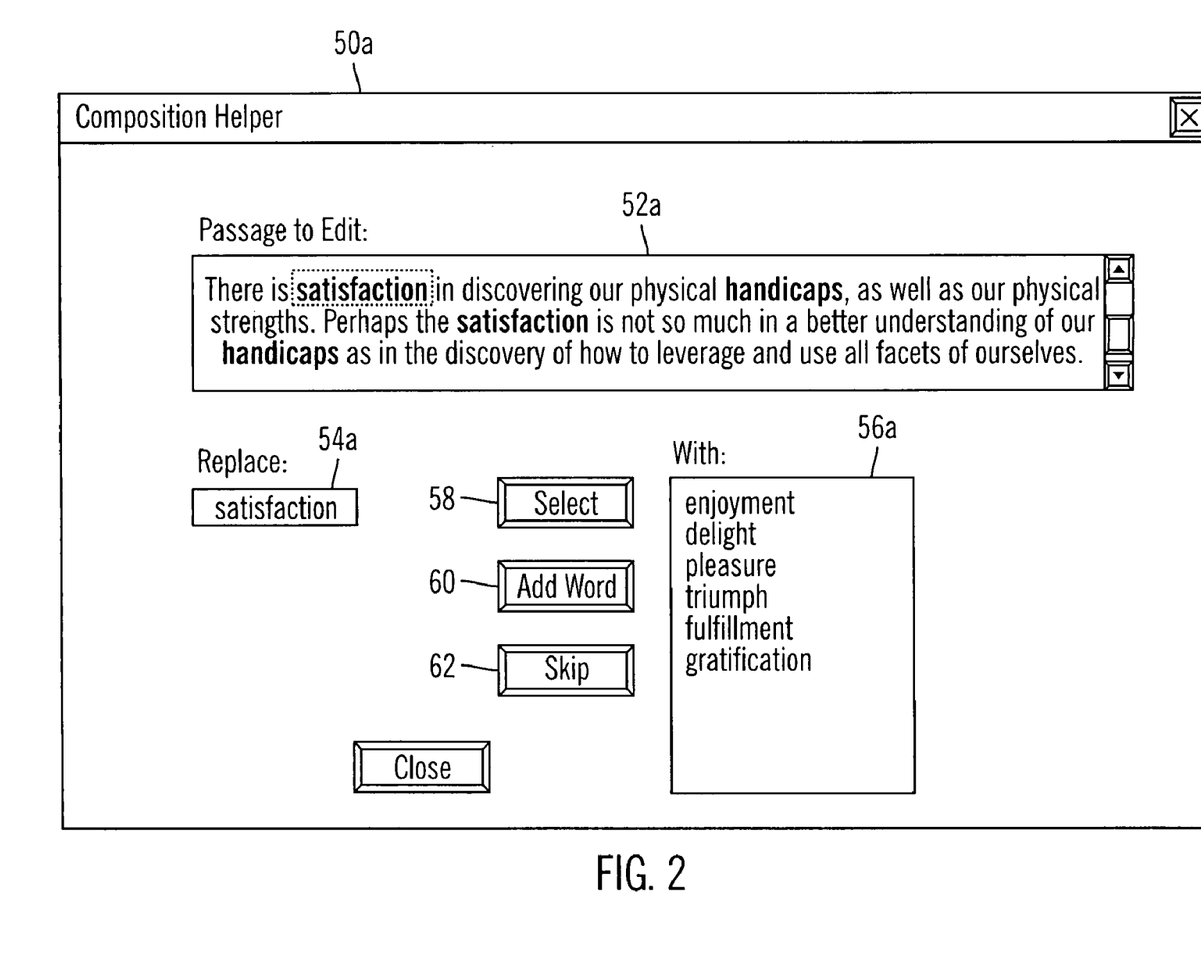
FIGS. 2–5 illustrate graphical user interface (GUI) panels in which preferred embodiments of the present invention are implemented.

FIG. 2 illustrates an example of a dialog box 50a the composition program 14 would generate on the display monitor 18 after processing a passage from the text in the document 16, shown in box 52a. Text box 52a displays the located repeated terms in the passage in bold. The replace box 54a displays the term highlighted in the text box 52a, e.g., "satisfaction" in FIG. 2, that the user may change with substitute terms displayed in a "with" window 56a. If the user finds an acceptable substitute term, then the user would highlight that term and select the "select" button 58, and that term would be substituted for the highlighted term in box 52a. Alternatively, if the user does not want to change the highlighted repeated term, then the user would select the "skip" button 62 to consider the next repeated term.

Figure 3:
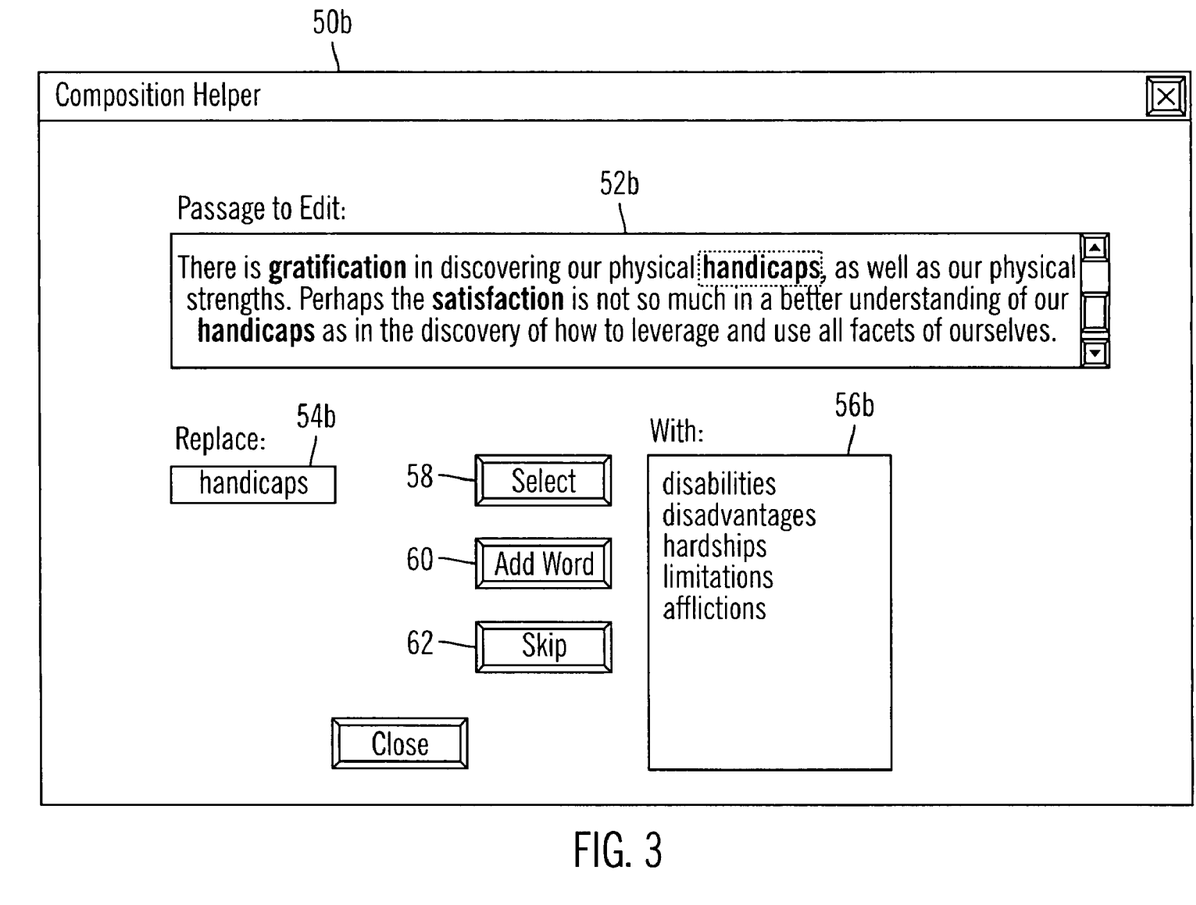

FIG. 3 shows the dialog box 50b after the user selected the term "gratification" in the "with" box 56a in FIG. 2. In FIG. 3, the term "gratification" is shown in text box 52b, which is substituted for the previously highlighted term "satisfaction" in box 52a. In FIG. 3, the "replace" box 54b shows the next repeated term "handicaps", highlighted in box 52b, and substitution terms for "handicaps" in the "with" box 56b.

Figure 4:
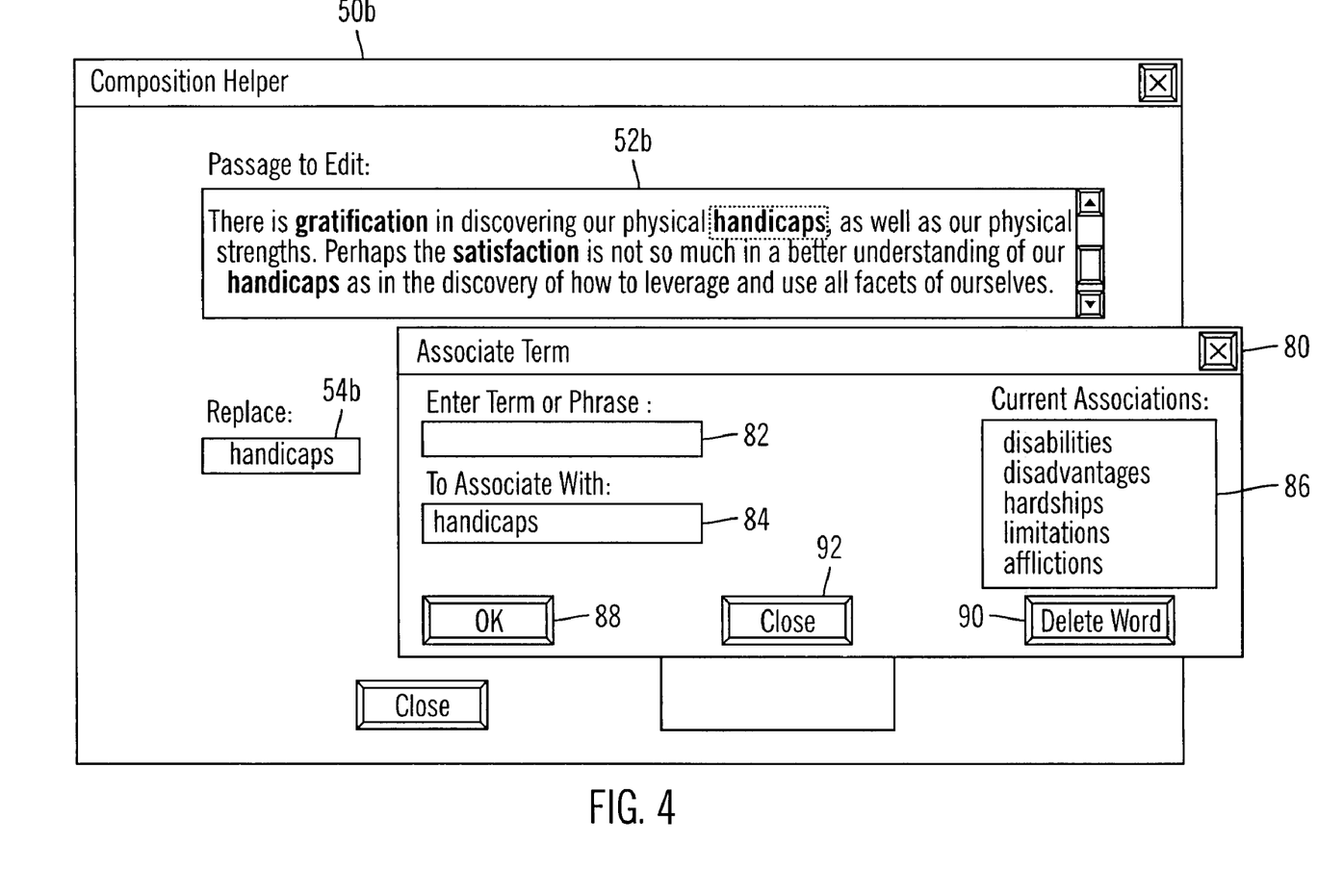

If the user selects the "add word" graphical button 60 in FIGS. 2 and 3, then the "associate term" dialog box 80 would be displayed as shown in FIG. 4. The user may enter a word in the "enter term" edit box 82 to associate with the term in the "associate with" box 84. In the example shown in FIG. 4, the "associate with" box 84 is pre-filled in with the term "handicaps" that was displayed in the "replace" box 54b when the user selected the "add word" button in the dialog box 50b in FIG. 3. Alternatively, the user may enter a different term in the "associate with" box 84. The "current associations" box 86 lists terms currently associated with the term in the "associated with" box 84. Selection of the "OK" button 88 associates the term or phrase in the "enter term" box 82 with the term displayed in the "associate with" box 84. This association may be done using currently known methods in the art for maintaining associations of words in a dictionary, thesaurus or other editing tool. Further, a term highlighted in the "current associations" box 86 may be removed from the group of words associated with the term in the "association with" box 84 by selecting the "delete" pushbutton 90.

In this way, whenever the term in the "associate with" 84 box is subsequently highlighted in the text box 52a, b (FIGS. 2, 3) as a repeated term, then the term added as an associated word through the "associate term" dialog box 80 will be displayed in the "with" box 56a, b in the composition helper dialog box 50a, b to provide a new substitution possibility for a repeated term. This allows the user to associate new terms or phrases with subject terms or phrases that will be considered when selecting terms or phrases to substitute for repeated terms or phrases.

Figure 5:
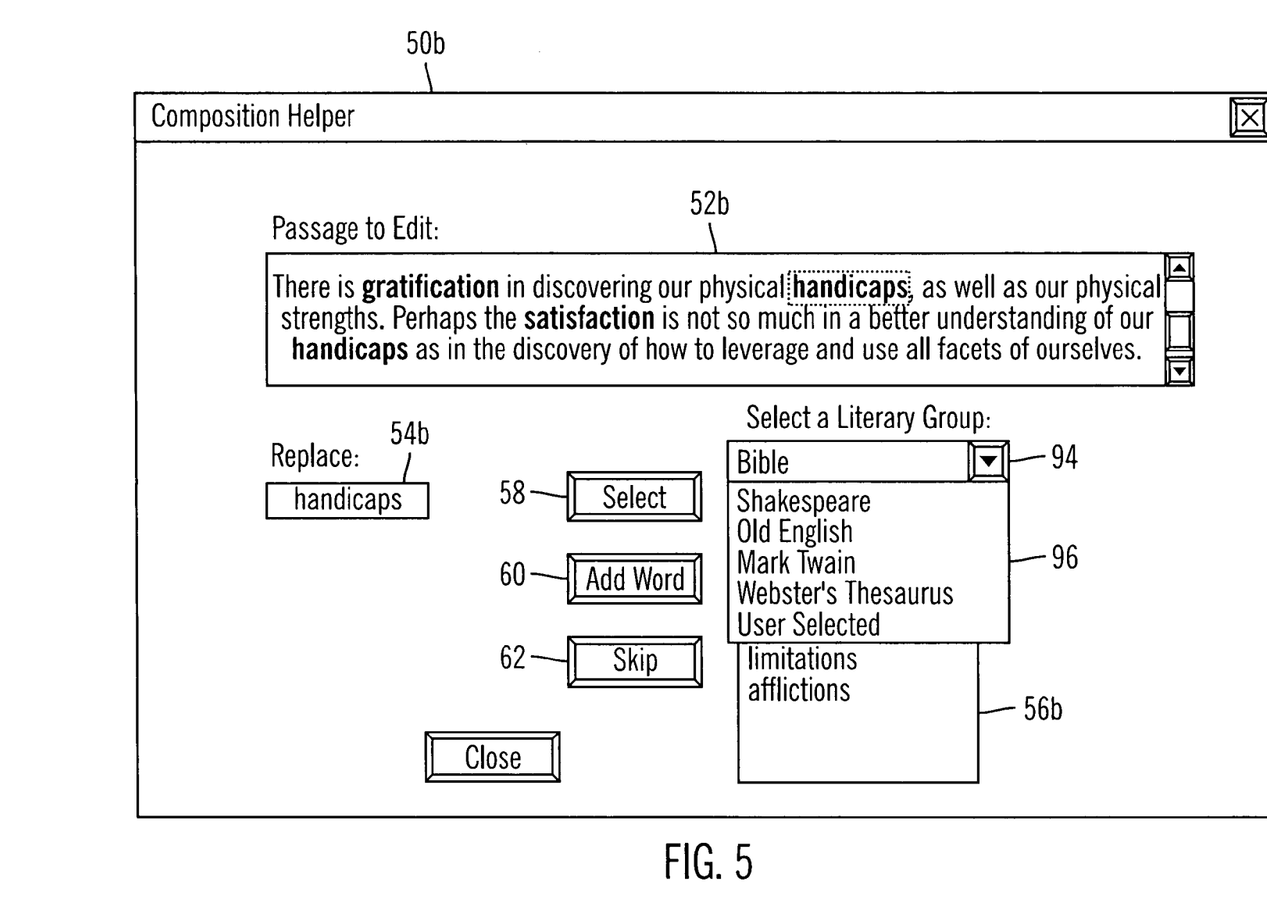

FIG. 5 illustrates an alternative embodiment including association groups. An association group provides a group of terms and associated words. An association group may comprise a literary category, such as Shakespeare, Biblical, Old English, American Slang, Mark Twain, user selected, etc. Each association group provides a separate association of substitute terms for terms based upon how the particular group or literary category associates words. For instance, in the Shakespeare group, the substitute terms would comprise terms that Shakespeare uses together, in parallel or to connote the same meaning. There may be an additional group for other literary figures, such as a Mark Twain. Further, a Biblical group could associate terms used together, in parallel or that are used for the same meaning as found in the Bible. The "user selected" group may comprise words associations created by a particular user. The user may start with a base association, such as the Webster's Thesaurus, and then over time create new associations and remove associations that are not particularly suited for substitution. In this way, a user may select substitute terms that would be used in that particular selected association group, e.g., Shakespeare, the Bible, user selected, etc.

FIG. 5 illustrates a "literary group" drop down menu 94 that displays a list 96 of selectable available association groups. The words displayed in the "with" box 56a, b are based on the words associated according to the association group selected from the drop down list 96. In this way, the composition program 14 would maintain different associations of related words to substitute for each other for different association types in association files. The association groups may be assembled using a text parsing program capable of determining words the association group treats as related, e.g., treated as related in the Bible, Mark Twain, etc. Alternatively, the association of words may be created by experts knowledgeable in the field of the particular association group. Thus, predefined association groups would be provided for use with the composition program 14.

Figure 6:
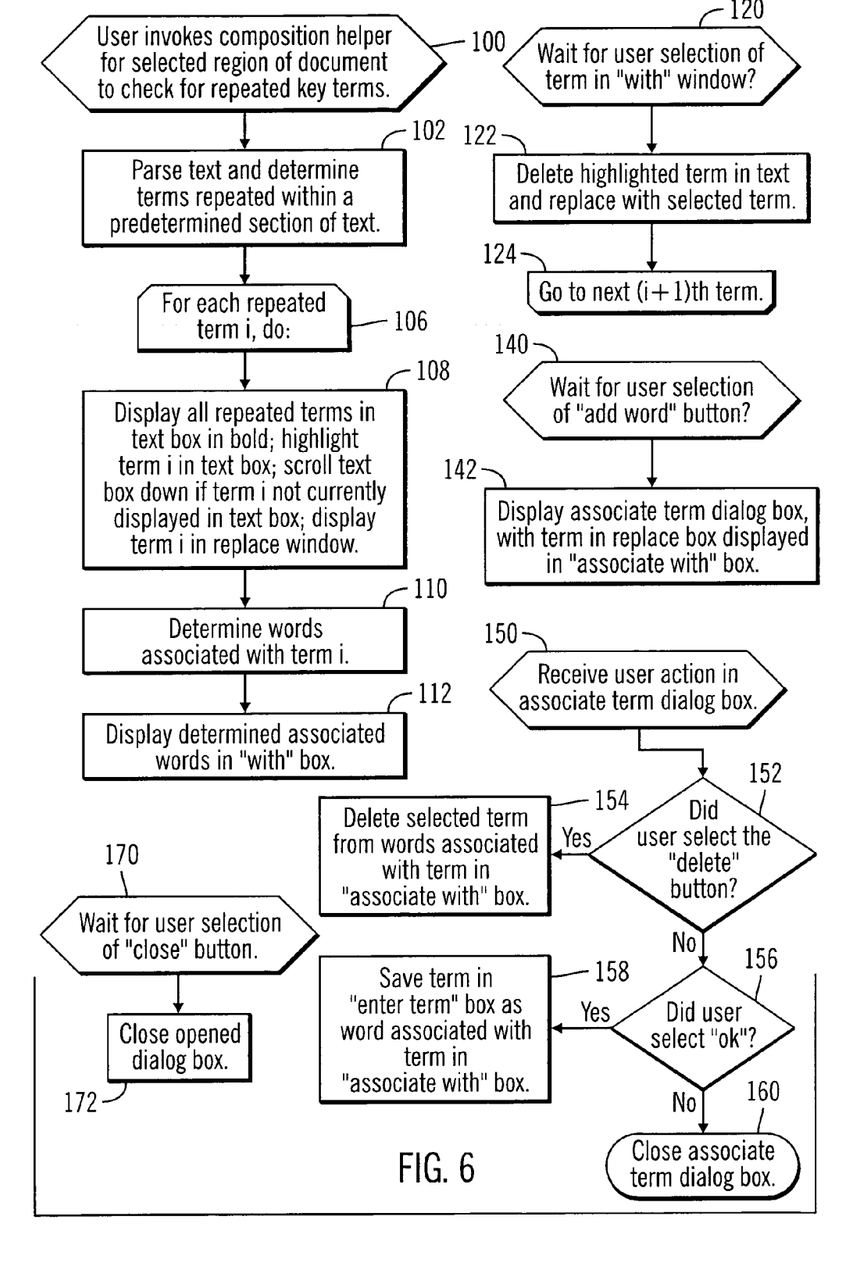
FIG. 6 illustrates program logic to assist users in editing text to improve the composition in accordance with preferred embodiments of the present invention.

FIG. 6 illustrates logic implemented in the composition program 14. The composition program 14 is invoked at block 100 when the computer 2 user invokes the composition program 14 for a selected region of text in the document 16. The selected region may comprise all the text in the document 16 or some portion thereof. The user may invoke the composition program 14 through the GUI menu of the text editor 12 or through a key on the input device 20. For instance, the composition program 14 may be invoked from the same menu item list where the user would invoke the spell checker, grammar checker and thesaurus. In response to being invoked, the composition program 14 parses (at block 102) the selected text and determines terms repeated within a predetermined section of text. The predetermined section by default may comprise a paragraph. However, the user may configure the composition program 14 to check for terms repeated within other subregions of the document, such as within sentences, pages, document sections, etc. In preferred embodiments, the composition program 14 would not check for commonly used terms such as "and", "to", "in", "the", etc.

Moreover, when determining repeated terms, the composition program 14 may locate variants of a term having the same "stem" using stemming algorithms known in the art. For instance, the composition program 14 could identify "gratify", "gratification", "grateful", "gratefulness" and "gratifying" as repeated terms having the same stem. Moreover, the composition program 14 could locate as terms words that include the stem, such as "ungrateful", "ingrate", etc.

After determining repeated terms, the composition program 14 begins a loop from blocks 106 to 124 for each repeated term i. At block 108, the composition program 14 highlights term i in the text box 52a, b; scrolls downward through the text in the document 16 displayed in the text box 52a, b if term i is not currently displayed in the text box 52a, b; displays all repeated terms displayed in the text box 52a, b as bold; and displays term i in the "replace" window 54a, b. The composition program 14 then determines (at block 110) all words associated with term i and displays (at block 112) all determined associated words in the "with" box 56a, b. As discussed, associated words may be stored in a manner known in the art, such as the data structure and algorithm techniques used for storing related words in a thesaurus program.

After block 112, the composition program 14 waits for the user to take a particular action. At block 120, the composition program 14 receives user selection of a term displayed in the "with" box 56a, b, i.e., the user highlighted a term in the "with" box and then selected the "select" button 58. In response, the composition program 14 (at block 122) would delete the highlighted repeated term i in the text displayed in text box 52a, b and replace the removed term with the selected term. The composition program 14 would then proceed (at block 124) back to block 106 to allow the user to change the next repeated term (i+1)th term in the text. As discussed, the user may select the "skip" button 62 to proceed to block 124 to consider the next repeated term without replacing the currently highlighted term.

At block 140, the composition program 14 receives user selection of the "add word" button 60 in the composition helper window 50a, b. In response, the composition program 14 displays (at block 142) the associate term dialog box 80 (FIG. 4) with the term i, which was displayed in the "replace" box 54a, b when the "add word" button 60 was selected, displayed in the "associate with" box 84.

At block 150, the composition program 14 receives a user selection of a button in the "associate term" dialog box 80. If the user selected (at block 152) the "delete word" button 90 while a term is selected in the "current associations" box 86, e.g., previously highlighted by the user input device, then the composition program 14 would delete (at block 154) the selected term in the "current associations box" 86 from the group of words associated with the term in the "association with" box 84. Otherwise, if the user selected the "OK" button 88, then the composition program 14 would save (at block 158) the term in the "enter term" box 82 as a word associated with the term in the "associate with" box 84. If the user (at block 156) did not select the "OK" button, then the only other button is the "close button" 92, which would cause the composition program 14 to close (at block 160) the "associate term" box 80.

If the user selects the "close" button in either the "composition helper" dialog box 50a, b or the "associate term" box 80, then the composition program 14 would close such window (block 170 and block 172). In preferred embodiments, after closing the "composition helper" box 50a, b, control is returned to the main GUI window of the text editor 12.

Preferred embodiments provide a composition tool to use with text editor and word processing programs known in the art to help the user avoid repeating certain key terms. The composition tool of the preferred embodiments automatically identifies repeated terms and then provides the user with a list of suitable substitute terms to use for one or more of the repeated terms.

ALTERNATIVE EMBODIMENTS AND CONCLUSIONS

This concludes the description of the preferred embodiments of the invention. The following describes some alternative embodiments for accomplishing the present invention.

The preferred embodiments may be implemented as a method, apparatus or program using standard programming and/or engineering techniques to produce software, firmware, hardware, or any combination thereof. The program, code and instructions in which the preferred embodiments are implemented are accessible from and embedded in an information bearing medium, which may comprise one or more computer-readable devices, firmware, programmable logic, memory devices (e.g., EEPROMs, ROMs, PROMs, RAMs, SRAMs, etc.), hardware, electronic devices, a computer readable magnetic storage unit, CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention.

The preferred algorithm described particular steps as occurring in a particular order. However, in further embodiments the order of the steps may be changed and certain steps removed and added without departing from the scope of the invention. Moreover, different steps may be performed to execute the overall operation of the algorithm.

The preferred embodiment GUI described repeated terms as being bolded and the term to substitute as being highlighted. In further embodiments, the repeated terms and term to substitute may be indicated in other ways, such as displaying the terms in different colors, different fonts, different font size, etc.

The preferred embodiment GUI was described as having particular pushbuttons to cause a particular set of actions to occur. In further embodiments, the GUI panels for the composition tool may include additional pushbuttons to provide additional functions or combinations of functions described herein.

In preferred embodiments, the composition program 14 provides a tool for editing repeated terms to allow the user to use the tool to substitute an associated term for the repeated term. In further embodiments, the composition program 14 may check for repeated phrases, such as "for instance," "in this way", etc., to allow the user to replace a repeated phrase with an associated phrase.

In summary, the present invention provides a system, method, and program for editing text in a computer text editor program. A determination is made of terms repeated in a section of text. A determination is then made of terms associated with the repeated terms that may be used as substitute terms for the repeated terms. A selection is made of one instance of one repeated term in the text and user selection is received of one associated term for the selected instance of the repeated term. The selected associated term is replaced for the selected instance of the repeated term in response to the user selection.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

**WORDPERFECT is a registered trademark of Corel Corporation; WORDPRO is a registered trademark of Lotus Development Corporation; MICROSOFT WORD is a registered trademark of Microsoft Corporation.

What is claimed is:

1. A computer implemented method for editing text in a computer text editor program, comprising:
    maintaining different groups of associated terms, wherein each group comprises different sets of associated terms, wherein the groups of associated terms comprise different literary categories, wherein a first literary category corresponds to words used by a named author and a second literary category corresponds to words used in a named book;
    determining terms repeated in a section of text;
    determining a selected group of associated terms;
    selecting one instance of one repeated term in the text;
    determining terms associated with the repeated terms that may be used as substitute terms for the repeated terms by determining terms in the selected group associated with the selected instance of the repeated term, wherein different groups are capable of providing different associated terms for the selected instance of the repeated term, and wherein the substitute terms are capable of being modified via user inputs;
    receiving user selection of one associated term for the selected instance of the repeated term; and
    replacing the selected associated term for the selected instance of the repeated term in response to the user selection.

2. The computer implemented method of claim 1, further comprising:
    selecting a next instance of one repeated term in the text not previously selected after replacing the previously selected associated term for the selected instance of the repeated term.

3. The computer implemented method of claim 1, wherein the section of text in which repeated terms are determined is capable of comprising; a paragraph; a sentence; a page; a sub-heading; or the entire document.

4. The computer implemented method of claim 1, further comprising:
    displaying a graphical user interface (GUI) with the repeated terms;
    graphically indicating the selected instance of the repeated term in the text;
    displaying the determined terms associated with the selected repeated term, wherein the user selected associated term is substituted into the text for the graphically indicated selected repeated term; and
    graphically indicating a next instance of one repeated term in the text as the next selected instance of one repeated term.

5. The computer implemented method of claim 4, further comprising:
    displaying the repeated terms with the text in the GUI differently than non-repeated terms in the text.

6. The computer implemented method of claim 1, further comprising:
    receiving user input of a term to associate with a subject term; and
    storing the association of the inputted term and the subject term, wherein the inputted term is one of the determined associated terms when the subject term is a subsequently determined repeated term.

7. The computer implemented method of claim 6, further comprising:
    receiving user input of a term to remove as an associated term with the subject term, wherein the removed term is not one of the determined associated terms when the subject term is a subsequently determined repeated term.

8. The computer implemented method of claim 1, further comprising:
    receiving user input indicating to modify the groups of associated terms, wherein the user input is capable of indicating to add additional associated terms to the groups, remove associated terms from the groups, remove an entire group and add a new group of associated terms; and
    performing the user received modification operation on the groups to modify the groups of associated terms.

9. The computer implemented method of claim 1, wherein determining terms repeated in the text further comprises determining repeated phrases in the text, wherein the terms associated with the repeated phrases comprise associated phrases.

10. The computer implemented method of claim 1, wherein the repeated terms are capable of including terms that are different words that include a same word stem.

11. The method of claim 1, further comprising:
receiving an user input that requests a modification to the substitute terms by adding at least one word in an editing tool;
modifying, via the editing tool, the substitute terms to generate new terms, in response to receiving the user input, wherein the new terms are capable of being associated with subject terms, wherein the new terms are capable of being considered for selecting a substitution for the repeated terms, and wherein the new terms are additions to predefined association groups; and
using the modified substitute terms to select a replacement for the repeated terms.

12. A system for editing text in a computer text editor program, comprising:
a computer;
a memory device accessible to the computer;
an application program loaded into the memory device, wherein the computer executes the application program from the memory to perform:
(i) maintaining different groups of associated terms, wherein each group comprises different sets of associated terms, wherein the groups of associated terms comprise different literary categories, wherein a first literary category corresponds to words used by a named author and a second literary category corresponds to words used in a named book:
(ii) determining terms repeated in a section of text;
(iii) determining a selected group of associated terms;
(iv) selecting one instance of one repeated term in the text;
(v) determining terms associated with the repeated terms that may be used as substitute terms for the repeated terms by determining terms in the selected group associated with the selected instance of the repeated term wherein different groups are capable of providing different associated terms for the selected instance of the repeated term, and wherein the substitute terms are capable of being modified via user inputs;
(vi) receiving user selection of one associated term for the selected instance of the repeated term; and
(vii) replacing the selected associated term for the selected instance of the repeated term in response to the user selection.

13. The system of claim 12, wherein the computer executes the application program to further perform:
selecting a next instance of one repeated term in the text not previously selected after replacing the previously selected associated term for the selected instance of the repeated term.

14. The system of claim 12, wherein the section of text in which repeated terms are determined is capable of comprising: a paragraph; a sentence; a page; a sub-heading; or the entire document.

15. The system of claim 12, further comprising a display monitor coupled to the computer, wherein the computer executes the application program to further perform:
displaying on the display monitory a graphical user interface (GUI) with the repeated terms;
graphically indicating in the GUI the selected instance of the repeated term in the text;
displaying the determined terms associated with the selected repeated term, wherein the user selected associated term is substituted into the text for the graphically indicated selected repeated term; and
graphically indicating in the GUI a next instance of one repeated term in the text as the next selected instance of one repeated term.

16. The system of claim 15, wherein the computer executes the application program to further perform:
displaying the repeated terms with the text in the GUT differently than non-repeated terms in the text.

17. The system of claim 12, wherein the computer executes the application program to further perform:
receiving user input of a term to associate with a subject term; and
storing the association of the inputted term and the subject term, wherein the inputted term is one of the determined associated terms when the subject term is a subsequently determined repeated term.

18. The system of claim 17, wherein the computer executes the application program to further perform:
receiving user input of a term to remove as an associated term with the subject term, wherein the removed term is not one of the determined associated terms when the subject term is a subsequently determined repeated term.

19. The system of claim 12, wherein the computer executes the application program to further perform:
receiving user input indicating to modify the groups of associated terms, wherein the user input is capable of indicating a modification operation to add additional associated terms to the groups, remove associated terms from the groups, remove an entire group or add a new group of associated terms; and
performing the user received modification operation on the groups to modify the groups of associated terms.

20. The system of claim 12, wherein determining terms repeated in the text further comprises determining repeated phrases in the text wherein the terms associated with the repeated phrases comprise associated phrases.

21. The system of claim 12, wherein the repeated terms are capable of including terms that are different words that include a same word stem.

22. The system of claim 12, wherein the computer executes the application program to further perform:
receiving an user input that requests a modification to the substitute terms by adding at least one word in an editing tool;
modifying, via the editing tool, the substitute terms to generate new terms, in response to receiving the user input, wherein the new terms are capable of being associated with subject terms, wherein the new terms are capable of being considered for selecting a substitution for the repeated terms, and wherein the new terms are additions to predefined association groups; and
using the modified substitute terms to select a replacement for the repeated terms.

23. A program for editing text in a computer text editor program, wherein the program includes code embedded in a computer readable medium capable of causing a computer to perform:
maintaining different groups of associated terms, wherein each group comprises different sets of associated terms wherein the groups of associated terms comprise different literary categories, wherein a first literary category corresponds to words used by a named author and a second literary category corresponds to words used in a named book;

determining terms repeated in a section of text;

determining a selected group of associated terms;

selecting one instance of one repeated term in the text;

determining terms associated with the repeated terms that may be used as substitute terms for the repeated terms by determining terms in the selected group associated with the selected instance of the repeated term, wherein different groups are capable of providing different associated terms for the selected instance of the repeated term and wherein the substitute terms are capable of being modified via user inputs;

receiving user selection of one associated term for the selected instance of the repeated term; and replacing the selected associated term for the selected instance of the repeated term in response to the user selection.

24. The program of claim 23, wherein the program code is further capable of causing the computer to perform:

selecting a next instance of one repeated term in the text not previously selected after replacing the previously selected associated term for the selected instance of the repeated term.

25. The program of claim 23, wherein the section of text in which repeated terms are determined is capable of comprising: a paragraph; a sentence; a page; a sub-heading; or the entire document.

26. The program of claim 23, wherein the program code is further capable of causing the computer to perform:

displaying a graphical user interface (GUI) with the repeated terms;

graphically indicating the selected instance of the repeated term in the text;

displaying the determined terms associated with the selected repeated term, wherein the user selected associated term is substituted into the text for the graphically indicated selected repeated term; and graphically indicating a next instance of one repeated term in the text as the next selected instance of one repeated term.

27. The program of claim 26, wherein the program code is further capable of causing the computer to perform:

displaying the repeated terms with the text in the GUI differently than non-repeated terms in the text.

28. The program of claim 23, wherein the program code is further capable of causing the computer to perform:

receiving user input of a term to associate with a subject term; and storing the association of the inputted term and the subject term, wherein the inputted term is one of the determined associated terms when the subject term is a subsequently determined repeated term.

29. The program of claim 28, wherein the program code is further capable of causing the computer to perform:

receiving user input of a term to remove as an associated term with the subject term, wherein the removed term is not one of the determined associated terms when the subject term is a subsequently determined repeated term.

30. The program of claim 23, wherein the program code is further capable of causing the computer to perform:

receiving user input indicating to modify the groups of associated terms, wherein the user input is capable of indicating to add additional associated terms to the groups, remove associated terms from the groups, remove an entire group and add a new group of associated terms; and performing the user received modification operation on the groups to modify the groups of associated terms.

31. The program of claim 23, wherein determining terms repeated in the text further comprises determining repeated phrases in the text, wherein the terms associated with the repeated phrases comprise associated phrases.

32. The program of claim 23, wherein the repeated terms are capable of including terms that are different words that include a same word stem.

33. The program of claim 23, wherein the program code is further capable of causing the computer to perform:

receiving an user input that requests a modification to the substitute terms by adding at least one word in an editing tool;

modifying, via the editing tool, the substitute terms to generate new terms, in response to receiving the user input, wherein the new terms are capable of being associated with subject terms, wherein the new terms are capable of being considered for selecting a substitution for the repeated terms, and wherein the new terms are additions to predefined association groups; and using the modified substitute terms to select a replacement for the repeated terms.

\* \* \* \* \*